(12) United States Patent
Sun et al.

(10) Patent No.: US 12,110,372 B2
(45) Date of Patent: *Oct. 8, 2024

(54) AROMATIC POLYAMIDE FILMS FOR TRANSPARENT FLEXIBLE SUBSTRATES

(71) Applicant: Akron Polymer Systems, Inc., Akron, OH (US)

(72) Inventors: Limin Sun, Copley, OH (US); Frank W. Harris, Boca Raton, FL (US); Jiaokai Jing, Uniontown, OH (US); Haci B. Erdem, Akron, OH (US); John D. Harvey, Seville, OH (US); Dong Zhang, Uniontown, OH (US)

(73) Assignee: Akron Polymer Systems, Inc., Akron, OH (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/360,733

(22) Filed: Jun. 28, 2021

(65) Prior Publication Data

US 2022/0267539 A1 Aug. 25, 2022

Related U.S. Application Data

(63) Continuation of application No. 15/284,024, filed on Oct. 3, 2016, now Pat. No. 11,046,825, which is a continuation of application No. 13/172,564, filed on Jun. 29, 2011, now Pat. No. 9,457,496.

(60) Provisional application No. 61/466,751, filed on Mar. 23, 2011.

(51) Int. Cl.
| | |
|---|---|
| C08J 5/18 | (2006.01) |
| B29C 35/02 | (2006.01) |
| B29C 39/14 | (2006.01) |
| B29C 41/24 | (2006.01) |
| B32B 17/06 | (2006.01) |
| B32B 17/10 | (2006.01) |
| B32B 27/34 | (2006.01) |
| C08G 69/32 | (2006.01) |
| C09D 177/10 | (2006.01) |
| B29K 77/00 | (2006.01) |
| B29L 7/00 | (2006.01) |
| B29L 31/34 | (2006.01) |

(52) U.S. Cl.
CPC .............. *C08J 5/18* (2013.01); *B29C 35/02* (2013.01); *B29C 39/14* (2013.01); *B29C 41/24* (2013.01); *B32B 17/06* (2013.01); *B32B 17/10* (2013.01); *B32B 27/34* (2013.01); *C08G 69/32* (2013.01); *C09D 177/10* (2013.01); *B29K 2077/00* (2013.01); *B29K 2077/10* (2013.01); *B29K 2995/0026* (2013.01); *B29L 2007/008* (2013.01); *B29L 2031/3475* (2013.01); *B32B 2457/206* (2013.01); *C08J 2377/10* (2013.01); *Y10T 428/24975* (2015.01); *Y10T 428/265* (2015.01)

(58) Field of Classification Search
CPC .... C08G 69/32; C08G 69/265; C08J 2377/10; C08L 77/10
See application file for complete search history.

(56) References Cited

U.S. PATENT DOCUMENTS

| | | | | |
|---|---|---|---|---|
| 9,457,496 B2 * | 10/2016 | Sun | ........................ | C08G 69/32 |
| 9,856,376 B2 * | 1/2018 | Sun | ........................ | C08L 77/10 |
| 2009/0318660 A1 * | 12/2009 | Bos | ........................ | C08G 69/32 |
| | | | | 528/310 |

OTHER PUBLICATIONS

Konagaya et al (Synthesis of Tern Copolyamides from Arom Diamine (m-Phenylenediamine, Diaminodiphenylsulfone), Arom Diamine with Carboxyl or SulfoGroup (3,5-Diaminobenzoic Acid, 2,4-Diaminobenzenesulfonic Acid), and Iso- or Terephthaloyl Chloride), J. of App Pol Sci, vol. 76, 913-920 (2000), published Mar. 2000.*

* cited by examiner

*Primary Examiner* — Gregory Listvoyb
(74) *Attorney, Agent, or Firm* — Benesch Friedlander Coplan & Aronoff LLP

(57) ABSTRACT

The present invention is directed toward transparent films prepared from soluble aromatic copolyamides with glass transition temperatures greater than 300° C. The copolyamides, which contain pendant carboxylic groups are solution cast into films using N,N-dimethylacetamide (DMAc), N-methyl-2-pyrrolidinone (NMP), or other polar solvents. The films are thermally cured at temperatures near the copolymer glass transition temperature. After curing, the polymer films display transmittances >80% from 400 to 750 nm, have coefficients of thermal expansion of less than 20 ppm, and are solvent resistant. The films are useful as flexible substrates for microelectronic devices.

8 Claims, No Drawings

AROMATIC POLYAMIDE FILMS FOR TRANSPARENT FLEXIBLE SUBSTRATES

CROSS-REFERENCE TO RELATED APPLICATION

This application is a continuation of U.S. application Ser. No. 15/284,024, entitled AROMATIC POLYAMIDE FILMS FOR TRANSPARENT FLEXIBLE SUBSTRATES, filed on Oct. 3, 2016, which is a continuation of U.S. application Ser. No. 13/172,564, entitled AROMATIC POLYAMIDE FILMS FOR TRANSPARENT FLEXIBLE SUBSTRATES, filed Jun. 29, 2011, which claims priority to U.S. Provisional Application Ser. No. 61/466,751 filed Mar. 23, 2011, the contents of each are incorporated herein by reference.

FIELD OF THE INVENTION

The invention relates to the manufacture of thermally and dimensionally stable transparent polymer films. More particularly, the invention relates to the manufacture and use of aromatic polyamides, which have a rigid backbone with a glass transition temperature higher than 300° C., yet are still soluble in conventional organic solvents without the need for the presence of inorganic salts. The polymer films can be prepared by solution casting, and cured at elevated temperatures. The cured films show a high optical transparency over a range of 400~750 nm, (transmittance >80%), a low coefficient of thermal expansion (CTE<20 ppm/° C.), and good solvent resistance.

BACKGROUND

Organic Light Emitting Diode (OLED) displays were a $1.25 billion market in 2010, which is projected to grow annually at a rate of 25%. The high efficiency and high contrast ratio of OLED displays make them a suitable replacement for liquid crystal displays (LCDs) in the mobile phone display, digital camera, and global positioning system (GPS) market segments. These applications place a premium on high electrical efficiency, compact size, and robustness. This has increased the demand for active matrix OLEDs (AMOLEDs) which consume less power, have faster response times, and higher resolutions. AMOLED innovations that improve these properties will further accelerate AMOLED adoption into portable devices and expand the range of devices that use them. These performance factors are largely driven by the processing temperature of the electronics. AMOLEDs have a thin-film transistor (TFT) array structure which is deposited on the transparent substrate. Higher TFT deposition temperatures can dramatically improve the electrical efficiency of the display. Currently, glass plates are used as AMOLED substrates. They offer high processing temperatures (>500° C.) and good barrier properties, but are relatively thick, heavy, rigid, and are vulnerable to breaking, which reduces product design freedom and display robustness. Thus, there is a demand by portable device manufacturers for a lighter, thinner, and more robust replacement. Flexible substrate materials would also open new possibilities for product design, and enable lower cost roll-to-roll fabrication.

Many polymer thin films have excellent flexibility, transparency, are relatively inexpensive, and are lightweight. Polymer films are excellent candidates for substrates for flexible electronic devices, including flexible displays and flexible solar cell panels, which are currently under development. Compared to rigid substrates like glass, flexible substrates offer some potentially significant advantages in electronic devices, including:
  a. Light weight (glass substrates represent about 98% of the total weight in a thin film solar cell);
  b. Flexible (Easy to handle, low transportation costs, and/or more applications for both raw materials and products); and,
  c. Amenable to roll-to-roll manufacturing, which could greatly reduce the manufacturing costs.

To facilitate these inherent advantages of a polymeric substrate for the flexible display application, several issues must be addressed including:
  a. Increasing the thermal stability;
  b. Reducing the coefficient of thermal expansion (CTE);
  c. Maintaining high transparency during high temperature processing; and,
  d. Increasing the oxygen and moisture barrier properties. Currently, no pure polymer film can provide sufficient barrier properties. To achieve the target barrier property, an additional barrier layer must be applied.

Several polymer films have been evaluated as transparent flexible substrates, including: polyethylene terephthalate (PET), polyethylene naphthalate (PEN), polycarbonate (PC), polyethersulfone (PES), cyclic olefin polymer (COP), polyarylates (PAR), polyimides (PI), and others. However, no one film can meet all the requirements. Currently, the industrial standard for this application is PEN film, which meets part of the requirements (Transmittance >80% between 400 nm~750 nm, CTE <20 ppm/° C.), but has a limited use temperature (<200° C.). A transparent polymer film with a higher thermal stability ($T_g$>300° C.) and a lower CTE (<20 ppm/° C.) is desirable.

Conventional aromatic polyimides are well known for their excellent thermal and mechanical properties, but their films, which must be cast from their polyamic acid precursors, are usually dark yellow to orange. Some aromatic polyimides have been prepared that can be solution cast into films that are colorless in the visible region, but such films do not display the required low CTE (For example, F. Li. F. W. Harris, and S. Z. D. Cheng, Polymer, 37, 23, pp 5321 1996). The films are also not solvent resistant. Polyimide films based on part or all alicyclic monomers, such as those described in patents JP 2007-063417 and JP 2007-231224, and publication by A. S. Mathews et al (J. Appl. Polym. Sci., Vol. 102, 3316-3326, 2006), show improved transparency. Although $T_g$s of these polymers can be higher than 300° C., at these temperatures the polymers do not show sufficient thermal stability due to their aliphatic units.

Fiber reinforced polymer composite films, such as reported by H. Ito (Jap. J. Appl. Phys., 45, No. 5B, pp 4325, 2006), combine the dimensional stability of fiber glass in a polymer film, offering an alternative way to achieve a low CTE. However, in order to maintain a high transparency, the refractive indices of the matrix polymer and the fiber must be precisely matched, which greatly limits the choice of the matrix polymer within an organic silicon resin. By using nanoparticles as filler, the effect of lowering CTE is not significant (J M Liu, et al, J. SID, Vol. 19, No. 1, 2011).

Although most aromatic polyamides are poorly soluble in organic solvents and cannot be solution cast into films, a few polymers have been prepared that are soluble in polar aprotic solvents containing inorganic salts. Some of these have been investigated for use as flexible substrates. For example, JP 2009-79210A describes a thin film prepared from a fluorine containing aromatic polyamide that displays a very low CTE (<0 ppm/° C.), good transparency (T % >80 between 450~700 nm), and excellent mechanical properties. However, the maximum thickness of films made from this polymer is 20 µm, because a dry-wet method where the salt is removed must be used for the film preparation. Most importantly, the film also displays poor resistance to strong organic solvents.

SUMMARY

The present invention is directed toward transparent films prepared from aromatic copolyamides with $T_g$s greater than 300° C. that have CTEs less than 20 ppm/° C. The films are cast using solutions of the polyamides in N,N-dimethylacetamide (DMAc), N-methyl-2-pyrrolidinone (NMP), or other polar solvents. The present invention can be produced in the absence of an inorganic salt. Surprisingly, it was discovered that the incorporation of a few free, pendant carboxyl groups along the polyamide backbones allowed the films to be thermally cured at elevated temperatures, which greatly increased their solvent resistance.

According to one embodiment of this invention, a process is provided for manufacturing a thermally and dimensionally stable transparent aromatic copolyamide film comprising the steps of: (A) forming a mixture of two or more aromatic diamines wherein at least one of the diamines contains one or more free carboxylic acid groups, such that the amount of the carboxylic acid containing diamine is greater than approximately 1 mole percent and less than approximately 10 mole percent of the total diamine mixture; (B) dissolving the aromatic diamine mixture in a polar solvent; (C) reacting the diamine mixture with at least one aromatic diacid dichloride, wherein hydrochloric acid and a polyamide solution is generated; (D) eliminating the hydrochloric acid with a reagent; (E) casting the polyamide solution into a film; and (F) curing the film at a temperature, wherein the temperature is at least 90% of the glass transition temperature of the film. The curing process involves heating the polymer films containing a free acid group near the $T_g$ for several minutes under an inert atmosphere or under reduced pressure. After the curing process, the film resists dissolution and/or swelling in commonly used organic solvents, including NMP, DMAc, dimethylsulfoxide (DMSO), etc. The word "eliminating" is defined to mean physically trapping, neutralizing, and/or chemically reacting the hydrochloric acid.

According to another embodiment of this invention, a transparent aromatic copolyamide film is produced having at least two repeat units of a general formula (I) and (II):

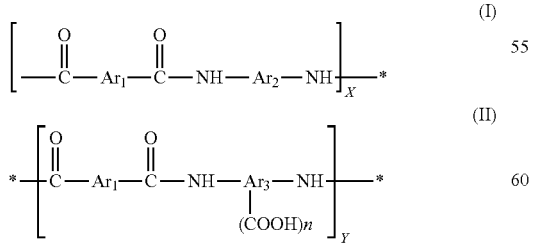

wherein n=1 to 4 (including, without limitation, 1, 2, 3, and 4), wherein $Ar_1$ is selected from the group of aromatic units which form aromatic diacid chlorides:

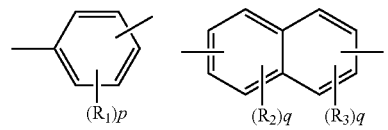

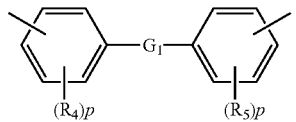

wherein p=4, q=3, and wherein $R_1$, $R_2$, $R_3$, $R_4$, $R_5$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, or substituted aryl such as halogenated aryls, alkyl ester and substituted alkyl esters, and combinations thereof. It is to be understood that each $R_1$ can be different, each $R_2$ can be different, each $R_3$ can be different, each $R_4$ can be different, and each $R_5$ can be different. $G_1$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene. $Ar_2$ is selected from the group of aromatic units which form diamines:

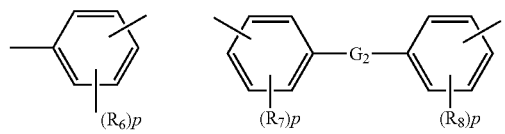

wherein p=4, wherein $R_6$, $R_7$, $R_8$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, substituted aryl such as halogenated aryls, alkyl ester, and substituted alkyl esters, and combinations thereof. It is to be understood that each $R_6$ can be different, each $R_7$ can be different, and each $R_8$ can be different. $G_2$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene. $Ar_3$ is selected from the group of aromatic units which form diamines containing free carboxylic acid group:

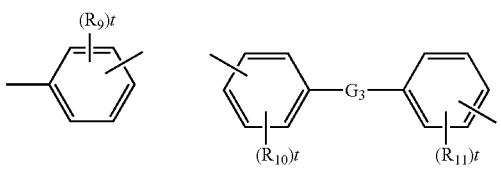

wherein t=1 to 3, wherein $R_9$, $R_{10}$, $R_{11}$ are selected from the group comprising hydrogen, halogen (fluoride, chloride, bromide, and iodide), alkyl, substituted alkyl such as halogenated alkyls like trifluoromethyl, nitro, cyano, thioalkyl, alkoxy, substituted alkoxy such as a halogenated alkoxy, aryl, substituted aryl such as halogenated aryls, alkyl ester, and substituted alkyl esters, and combinations thereof. It is to be understood that each $R_9$ can be different, each $R_{10}$ can be different, and each $R_{11}$ can be different. $G_3$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene. It should be understood that the copolymer may contain multiple repeat units with structures (I) and (II) where $Ar_1$, $Ar_2$, and $Ar_3$ may be the same or different.

According to yet another embodiment of this invention, a method of preparing a transparent film having a CTE less than 20 ppm/° C. that is stable for at least one hour at 300° C. comprising the steps of:

(A) reacting a mixture of aromatic diamines, in a polar solvent, wherein at least one of the diamines includes a pendant carboxylic acid group of the general formula (III):

(III)

wherein n=1 to 4 (including, without limitation, 1, 2, 3, and 4), wherein Ar is selected from the group of aromatic units which form diamines containing free carboxylic acid group:

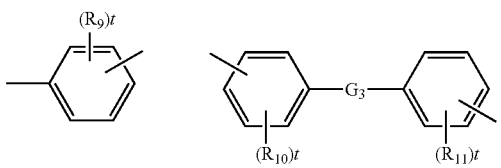

wherein m=1 or 2, wherein t=1 to 3, wherein $R_9$, $R_{10}$, $R_{11}$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, substituted aryl such as halogenated aryls, alkyl ester, and substituted alkyl esters, and combinations thereof. It is to be understood that each $R_9$ can be different, each $R_{10}$ can be different, and each $R_{11}$ can be different. $G_3$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene; with aromatic diacid chlorides to afford a copolyamide containing pendant carboxyl groups;

(B) solution casting the resulting copolyamide into a film; and, (C) curing the film to induce solvent resistance.

Polyamides containing free pendant carboxylic groups have been prepared using 3,5-diaminobenzoic acid (DAB) or 4,4'-diaminodiphenic acid (DADP). In U.S. Pat. No. 5,160,619, polyamides containing small amounts of DAB (less than 1 mol %) useful for reverse osmosis membranes are described. In U.S. Pat. No. 5,039,785, polyamides containing more than 10 mol % DADP useful for high performance fibers are described. However, there has been no attempt to crosslink films of these polymers by heating them to temperatures near their $T_g$s. Even if the inventors had attempted to crosslink them in this unexpected manner, in the case of the polymers containing DAB, the carboxylic acid content would have been too low to affect cross linking, and in the case of the DADP polymers, the degree of cross linking would have been so high that the films would have been extremely brittle and unsuitable for flexible substrates.

Thus, it was surprising to find that the incorporation of about 1 mole % to about 10 mole % of a diamine, containing free carboxyl groups, in the copolyamides in this invention could allow the polymers to be crosslinked within a short period of time (minutes) when their films were heated at temperatures close to their $T_g$s. For example, the incorporation of these amounts of DADP or DAB resulted in films resistant to solvents commonly used in the microelectronic industry that had retained their transparency through the crosslinking process. The crosslinked films displayed high glass transition temperatures ($T_g$>300° C.), and low coefficients of thermal expansion (<20 ppm/° C.). Thus, the crosslinked films can be used as flexible substrates that will enable the high temperature fabrication of thin film transistors needed for a wide range of microelectronic applications, particularly for ruggedized or flexible organic light emitting diode (OLED) displays. No available material exhibits all of these properties.

The polymer substrate films in the present invention expand the utilization of AMOLEDs in portable devices by improving device electrical efficiency and the consumer experienced robustness of the display. In addition to the standard OLED display market, the substrate of the present invention will enable the development of the flexible display market. These displays can be used for conformable displays that can be integrated onto clothing, flexible e-paper and e-book displays, displays for smartcards, and a host of other new applications. For example, the polymer substrate films in the present invention can be used for flexible sensors. The new devices produced from the polymer substrate films in the present invention can dramatically impact daily life, by decreasing the cost and increasing accessibility and portability of information.

Additionally, the polymers in the present invention can be prepared in a common organic solvent at room temperature (approximately 15° C. to approximately 25° C.). These polymers can be produced in the absence of an inorganic salt. The resulting colorless and homogenous polymer solution can be used directly for subsequent film casting. No special polymerization reactor and no polymer isolation procedure is required. However, after the polymers are heated at temperatures near their $T_g$s for several minutes, the polymer films are inherently insoluble and chemically resistant to swelling when exposed to inorganic or organic solvents. Thus, the process is amenable to scale-up to metric ton quantities.

The polymers of the present invention are soluble in polar aprotic solvents without the need for the presence of inorganic salts. They can be solution cast in a batch process, or continuously cast directly from their polymerization mixtures and cured using a roll-to-roll process to yield free standing transparent films with thickness greater than 20 μm. Alternatively, the polymer solutions may be solution cast onto a reinforcing substrate like thin glass or a microelectronic device and cured to form films less than 20 μm. The films display high $T_g$s (>300° C.), low CTEs (<20 ppm/° C.), high transparencies (T>80% between 400 to 750 nm), excellent mechanical properties (tensile strengths >200 MPa), and low moisture absorptions (<2% @ 100% humidity at room temperature). Furthermore, the films show excellent chemical resistance after they are heated to temperatures of at least 90% that of their $T_g$s for short periods of time.

The copolyamides were prepared by polymerizing one or more aromatic diacid dichlorides as shown in the following general structures:

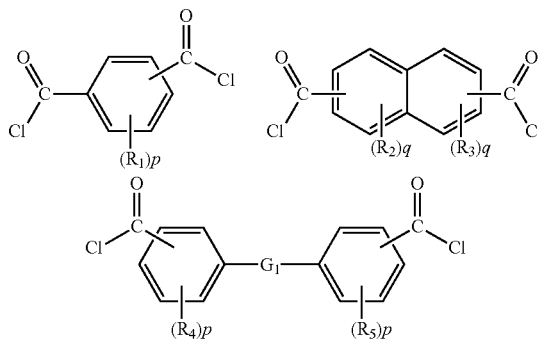

wherein p=4, q=3, and wherein $R_1$, $R_2$, $R_3$, $R_4$, $R_5$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, or substituted aryl such as halogenated aryls, alkyl ester and substituted alkyl esters, and combinations thereof. It is to be understood that each $R_1$ can be different, each $R_2$ can be different, each $R_3$ can be different, each $R_4$ can be different, and each $R_5$ can be different. $G_1$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene.

And two or more aromatic diamines as shown in the following general structures:

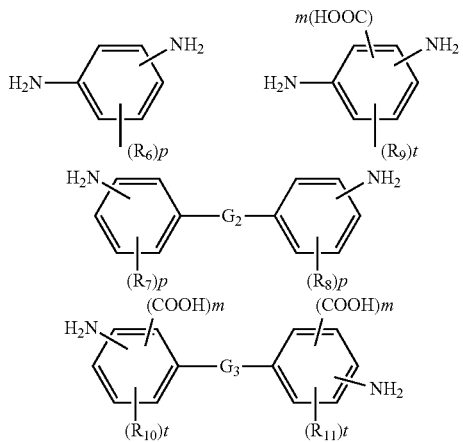

wherein p=4, m=1 or 2, and t=1 to 3, wherein $R_6$, $R_7$, $R_8$, $R_9$, $R_{10}$ $R_{11}$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, substituted aryl such as halogenated aryls, alkyl ester, and substituted alkyl esters, and combinations thereof. It is to be understood that each $R_6$ can be different, each $R_7$ can be different, each $R_8$ can be different, each $R_9$ can be different, each $R_{10}$ can be different, and each $R_{11}$ can be different. $G_2$ and $G_3$ are selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a Si $(CH_3)_2$ group; 9,9-fluorene group; substituted 9,9-fluorene; and an OZO group, wherein Z is a aryl group or substituted aryl group, such as phenyl group, biphenyl group, perfluorobiphenyl group, 9,9-bisphenylfluorene group, and substituted 9,9-bisphenylfluorene.

DETAILED DESCRIPTION

The present invention is directed toward transparent films prepared from aromatic copolyamides. A polyamide is prepared via a condensation polymerization in a solvent, where the hydrochloric acid generated in the reaction is trapped by a reagent like propylene oxide (PrO). The film can be made directly from the reaction mixture, without the need for isolating and re-dissolving the polyamide. Colorless films can be prepared by casting procedures directly from the polymerization solutions. The product of the reaction of the hydrochloric acid with the PrO is eliminated during the removal of the solvent. These films display low CTEs as cast and do not need to be subjected to stretching. By carefully manipulating the ratio of the monomers used to prepare the copolyamides, the CTEs and $T_g$s of the resulting copolymers and the optical properties of their solution cast films can be controlled. It is particularly surprising that a film can be cured at an elevated temperature when free carboxylic acid side groups exist along the polymer chains. If the reaction of the reagent with the hydrochloric acid does not form volatile products, the polymer is isolated from the polymerization mixture by precipitation and re-dissolved by a polar solvent (without the need for inorganic salts) and cast in the film. If the reaction of the reagent with the hydrochloric acid does form volatile products, the film can be directly cast. One example, above, of a reagent that forms volatile products is PrO.

Representative and illustrative examples of the useful aromatic diacid dichlorides in the invention are:

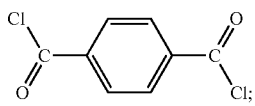

Terephthaloyl dichloride (TPC)

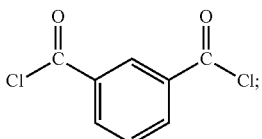

Isophthaloyl dichloride (IPC)

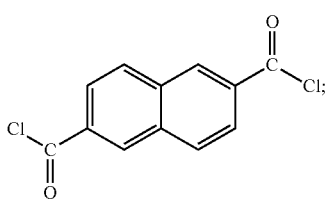

2, 6-Naphthaloyl dichloride (NDC)

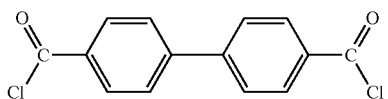

4, 4'-Biphenyldicarbonyl dichloride (BPDC)

Representative and illustrative examples of the useful aromatic diamines in the invention are:

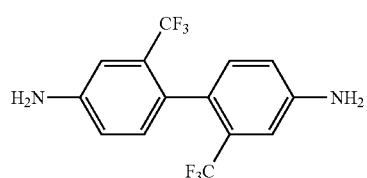

4,4'-Diamino-2,2'-bistrifluoromethylbenzidine (PFMB)

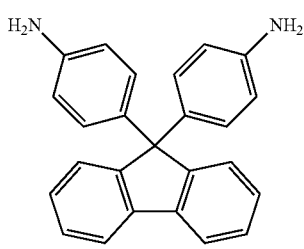

9,9-Bis(4-aminophenyl)fluorine (FDA)

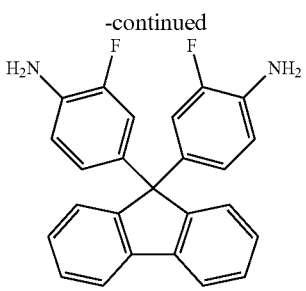

9,9-Bis(3-fluoro-4-aminophenyl)fluorine (FFDA)

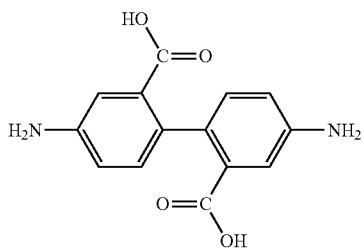

4,4'-Diaminodiphenic acid (DADP)

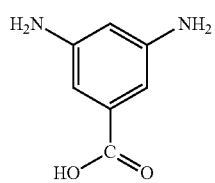

3,5-Diaminobenzoic acid (DAB)

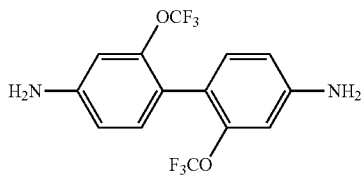

4,4'-Diamino-2,2'-bistrifluoromethoxylbenzidine (PFMOB)

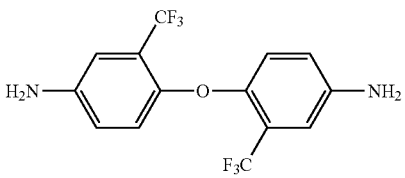

4,4'-Diamino-2,2'-bistrifluoromethyldiphenyl ether (6FODA)

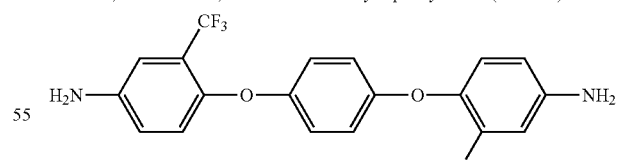

Bis(4-amino-2-trifluoromethylphenyloxyl) benzene (6FOQDA)

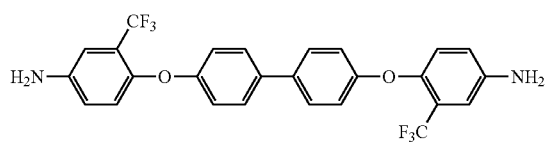

Bis(4-amino-2-trifluoromethylphenyloxyl) biphenyl (6FOBDA)

EXAMPLES

Example 1. This example illustrates the general procedure for the preparation of a copolymer from TPC, IPC and PFMB (70%/30%/100% mol) via solution condensation.

To a 250 ml, three necked, round bottom flask, equipped with a mechanical stirrer, a nitrogen inlet and an outlet, are added PFMB (3.2024 g, 0.01 mol) and dried DMAc (45 ml). After the PFMB dissolves completely, IPC (0.6395 g 0.003 mol) is added to the solution at room temperature under nitrogen, and the flask wall is washed with DMAc (1.5 ml). After 15 minutes, TPC (1.4211 g, 0.007 is added to the solution, and the flask wall is again washed with DMAc (1.5 ml). The viscosity of the solution increases until the mixture forms a gel. After adding PrO (1.4 g, 0.024 mol), the gel is broken up under stirring to form a viscous, homogenous solution. After stirring at room temperature for another 4 hours, the resulting copolymer solution can be directly cast into film.

Example 2. This example illustrates the general procedure for the preparation of a copolymer from TPC, PFMB, and FDA (100%/80%/20% mol) via solution condensation.

To a 100 ml, four necked, round bottom flask, equipped with a mechanical stirrer, a nitrogen inlet and outlet, are added PFMB (1.0247 g, 3.2 mmol), FDA (0.02788 g, 0.8 mmol), and dried DMAc (20 ml) at room temperature under nitrogen. After the PFMB dissolves completely, TPC (0.8201 g 4.04 mmol) is added to the solution, and the flask wall is washed with DMAc (5.0 ml). The viscosity of the solution increases until the mixture forms a gel. After adding PrO (0.5 g, 8.5 mmol), the gel is broken up under stirring to form a viscous, homogenous solution. After stirring for another 4 hours at room temperature, the resulting copolymer solution can be directly cast into film.

Example 3. This example illustrates the general procedure for the preparation of a copolymer from TPC, IPC, DADP, and PFMB (70%/30%/3%/97% mol) via solution condensation.

To a 250 ml, three necked, round bottom flask, equipped with a mechanical stirrer, a nitrogen inlet and outlet, are added PFMB (3.1060 g, 0.0097 mol), DADP (0.0817 g, 0.0003 mol), and dried DMAc (45 ml) at room temperature under nitrogen. After the PFMB dissolves completely, IPC (0.6091 g 0.003 mol) is added to the solution, and the flask wall is washed with DMAc (1.5 ml). After 15 minutes, TPC (1.4211 g, 0.007 mol) is added, and the flask wall is again washed with DMAc (1.5 ml). The viscosity of the solution increases until the mixture forms a gel. After adding PrO (1.4 g, 0.024 mol), the gel is broken up under stirring to form a viscous, homogenous solution. After stirring for another 4 hours at room temperature, the resulting copolymer solution can be directly cast into film.

Example 4. This example illustrates the general procedure for the preparation of a copolymer from TPC, IPC, DAB, and PFMB (75%/25%/5%/95% mol) via solution condensation.

To a 250 ml, three necked, round bottom flask, equipped with a mechanical stirrer, a nitrogen inlet and outlet, are added PFMB (3.0423 g, 0.0095 mol), DAB (0.0761 g, 0.0005 mol), and dried DMAc (45 ml) at room temperature under nitrogen. After the PFMB dissolves completely, IPC (0.5076 g 0.0025 mol) is added to the solution, and the flask wall is washed with DMAc (1.5 ml). After 15 minutes, TPC (1.5227 g, 0.0075 mol) is added, and the flask wall is again washed with DMAc (1.5 ml). The viscosity of the solution increases until the mixture forms a gel. After adding PrO (1.4 g, 0.024 mol), the gel is broken up under stirring to form a viscous, homogenous solution. After stirring for another 4 hours at room temperature, the resulting copolymer solution can be directly cast into film.

It is to be understood, although the temperature provided in the examples is room temperature, the temperature range can be between approximately −20° C. to approximately 50° C., and in some embodiments from approximately 0° C. to approximately 30° C.

Preparation and Characterization of the Polymer Films

The polymer solution can be used directly for the film casting after polymerization. For the preparation of small films in a batch process, the solution is poured on a flat glass plate or other substrate, and the film thickness is adjusted by a doctor blade. After drying on the substrate, under reduced pressure, at 60° C. for several hours, the film is further dried at 200° C. under protection of dry nitrogen flow for 1 hour. The film is cured by heating at or near the polymer $T_g$ under vacuum or in an inert atmosphere for several minutes. Mechanical removal from the substrate yields a free standing film greater than approximately 10 μm thick. The thickness of the free standing films can be adjusted by adjusting the solids content and viscosity of the polymer solution. It is to be understood that the film can be cured at any temperature between approximately 90% and approximately 110% of the $T_g$. It is also understood that the batch process can be modified so that it can be carried out continuously by a roll-to-roll process by techniques known to those skilled in the art.

In one embodiment of this invention, the polymer solution may be solution cast onto a reinforcing substrate like thin glass, silica, or a microelectronic device. In this case, the process is adjusted so that the final polyamide film thickness is greater than approximately 5 μm.

The CTE and $T_g$ are measured with a thermal mechanical analyzer (TA Q 400 TMA). The sample film has a thickness of approximately 20 μm, and the load strain is 0.05N. In one embodiment, the free standing film thickness is between approximately 20 μm and approximately 125 μm. In one embodiment, the film is adhered to a reinforcing substrate and the film thickness is <20 μm. In one embodiment, the CTE is less than approximately 20 ppm/° C., but it is understood that in other embodiments, the CTE is less than approximately 15 ppm/° C., less than approximately 10 ppm/° C., and less than approximately 5 ppm/° C. It is to be understood that within these embodiments the CTE can be less than approximately 19, 18, 17, 16, 15, 14, 13, 12, 11, 10, 9, 8, 7, 6, or 5 ppm/° C. The experimentally derived CTEs are the average of the CTE obtained from room temperature to about 250° C.

Film transparency is measured by determining the transmittance of a 10 μm thick film from 400 to 750 nm with a UV-Visible spectrometer (Shimadzu UV 2450).

The solvent resistance of the film is determined by immersing it in a selected solvent for 30 minutes at room temperature. The film is considered solvent resistant if it is substantially free of surface wrinkles, swelling, or any other visible damage after immersion. The films are useful as substrates for flexible electronic devices.

To determine the ratio of reactants necessary to obtain a soluble copolyamide that can be solution cast into a colorless film with a $T_g$>300 C, a CTE <20 ppm, and a transmittance >80% from 400 to 750 nm, a preliminary study can be conducted where the amount of reactants that do not contain free carboxyl groups are varied in a systematic manner. The properties of the films of the copolymers obtained are measured in order to determine suitable copolymer candidates (base polymers) for the incorporation of free carboxyl groups. Such studies are well understood by those skilled in the art. The following tables show comparative examples of such studies used to determine some on the base polymers utilized in the present invention.

TABLE 1

Properties of films based on TPC/IPC/PFMB

| TPC/IPC/PFMB | CTE ppm/° C. | $T_g$ ° C. | Film Transparency |
|---|---|---|---|
| 100/0/100 | — | — | Opaque |
| 90/10/100 | — | — | Opaque |
| 80/20/100 | — | — | Opaque |
| 75/25/100 | — | — | Opaque |
| 70/30/100 (Example 1) | 7.4 | 336 | Clear |
| 60/40/100 | 8.0 | 323 | Clear |
| 50/50/100 | 12.2 | 330 | Clear |
| 40/60/100 | 22.4 | 336 | Clear |
| 30/70/100 | 32.6 | 319 | Clear |
| 20/80/100 | 27.9 | 326 | Clear |
| 10/90/100 | 30.1 | 325 | Clear |
| 0/100/100 | 34.2 | 327 | Clear |

TABLE 2

Properties of films based on TPC/FDA/PFMB

| TPC/FDA/PFMB | CTE ppm/° C. | $T_g$ ° C. | Film Transparency |
|---|---|---|---|
| 100/0/100 | — | — | Opaque |
| 100/10/90 | — | — | Opaque |
| 100/20/80 (Example 2) | 5.8 | 365 | Clear |
| 100/30/70 | 5.1 | 370 | Clear |
| 100/50/50 | 13.1 | 391 | Clear |
| 100/70/30 | 18.3 | 406 | Clear |
| 100/80/20 | 26.7 | 404 | Clear |
| 100/90/10 | 33.2 | 410 | Clear |
| 100/100/0 | >40 | >410 | Clear |

To determine the minimum amount of carboxyl groups necessary to thermally crosslink the copolymer without significantly changing the properties, a second preliminary study can be conducted where various amounts of a reactant containing free carboxyl groups are copolymerized with the mixture of reactants used to prepare the base polymer. Films of the copolymers obtained and their properties determined. For example, various amounts of DADP were copolymerized with the reactants used in the preparation of the base polymer made from a mixture of TPC, IPC and PFMB in a 70/30/100 ratio (Example 1). The films of the copolymers obtained containing DADP were thermally treated at 330° C. for 5 minutes. After curing, the film resistance to NMP was evaluated. The results are shown in Table 3.

TABLE 3

NMP resistance test for TPC/IPC/PFMB/DADP polymer films

| TPC/IPC/PFMB/DADP | NMP resistance |
|---|---|
| 70/30/99/1 | No |
| 70/30/97/3 (Example 3) | Yes |
| 70/30/95/5 | Yes |

The properties of polymer films based on Example 3 after curing are shown in Table 4. The composition of a copolymer containing DAB (Example 4), which was determined in an analogous manner, is also shown in Table 4 along with the properties of cured films of this polymer.

TABLE 4

Properties of films after curing

| | Example 3 | Example 4 |
|---|---|---|
| TPC | 70 | 75 |
| IPC | 30 | 25 |
| PFMB | 97 | 95 |
| DADP | 3 | 0 |
| DAB | 0 | 5 |
| Curing Conditions | 330° C. × 5 minutes | 330° C. × 10 minutes |
| $T_g$ (° C.) | 334 | 350 |
| CTE (ppm/° C.) | 7 | 12 |
| T % at 400 nm | 80 | 81 |
| DMAc resistance | Yes | Yes |
| NMP resistance | Yes | Yes |
| DMSO resistance | Yes | Yes |

The cured films of this invention are resistant to both inorganic and organic solvents. The film solvent resistance can be evaluated quickly by analyzing the resistance to NMP, a commonly used strong solvent. It has been found that films resistant to this solvent are also resistant to other polar solvents.

The following are exemplary polymers that can be used in this invention—1) about 50 to about 70 mol % TPC, about 30 to about 50 mol % IPC, about 90 to about 99 mol % PFMB, and about 1 to about 10 mol % 4,4'-Diaminodiphenic acid (DADP); 2) about 50 to about 70 mol % TPC, about 25 to about 50 mol % IPC, about 90 to about 96 mol % PFMB, and about 4 to about 10 mol % 3,5-diaminobenzoic acid (DAB); 3) about 100 mol % TPC, about 25 to about 85 mol % PFMB, about 15 to about 50 mol % 9,9-Bis(4-aminophenyl)fluorine (FDA), and about 1 to about 10 mol % DADP; and 4) about 100 mol % TPC, about 50 to about 85 mol % PFMB, about 15 to about 50 mol % FDA, and about 4 to about 10 mol % DAB.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof. Although the description above contains much specificity, this should not be construed as limiting the scope of the invention, but as merely providing illustrations of some of the embodiments of this invention. Various other embodiments and ramifications are possible within its scope.

Furthermore, notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Having thus described the invention, it is now claimed:

1. A transparent film having a glass transition temperature greater than approximately 300° C. and a coefficient of thermal expansion of less than approximately 20 ppm/° C., consisting essentially of an aromatic copolyamide characterized by:

at least two repeat structures, wherein one of the repeat structures is repeat structure (V)

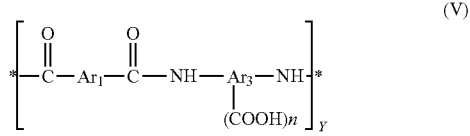

(V)

wherein n=1 to 4;
where Y is the molar ratio of the repeat structure (V) with respect to all other repeat structures, and Y is from 0.01 to 0.10;
wherein $Ar_1$ is selected from the group comprising:

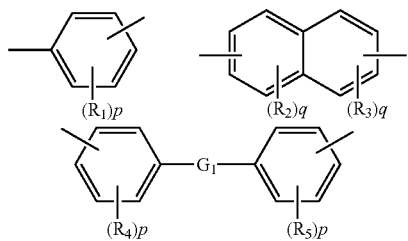

wherein p=4, q=3, and wherein $R_1$, $R_2$, $R_3$, $R_4$, $R_5$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, or substituted aryl such as halogenated aryls, alkyl ester and substituted alkyl esters, and combinations thereof, wherein $G_1$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a $Si(CH_3)_2$ group; 9, 9-fluorene group; substituted 9, 9-fluorene; and an OZO group, wherein Z is a aryl group or substituted aryl group, such as phenyl group, biphenyl group, perfluorobiphenyl group, 9, 9-bisphenylfluorene group, and substituted 9, 9-bisphenylfluorene;
wherein $Ar_2$ is selected from the group comprising:

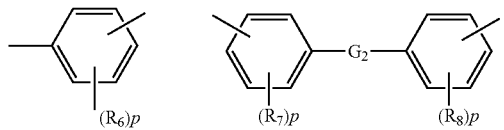

wherein p=4, wherein $R_6$, $R_7$, $R_8$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as a halogenated alkoxy, aryl, substituted aryl such as halogenated aryls, alkyl ester, and substituted alkyl esters, and combinations thereof, wherein $G_2$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a $Si(CH_3)_2$ group; 9, 9-fluorene group; substituted 9, 9-fluorene; and an OZO group, wherein Z is a aryl group or substituted aryl group, such as phenyl group, biphenyl group, perfluorobiphenyl group, 9, 9-bisphenylfluorene group, and substituted 9, 9-bisphenylfluorene;
wherein $Ar_3$ is selected from the group comprising:

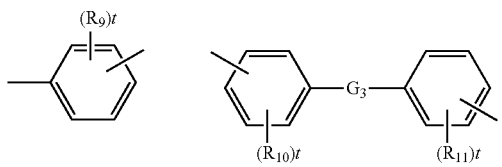

wherein m=1 or 2, wherein t=1 to 3, wherein $R_9$, $R_{10}$, $R_{11}$ are selected from the group comprising hydrogen, halogen (fluoride, chloride, bromide, and iodide), alkyl, substituted alkyl such as halogenated alkyls, nitro, cyano, thioalkyl, alkoxy, substituted alkoxy such as halogenated alkoxy, aryl, substituted aryl such as halogenated aryls, alkyl ester, and substituted alkyl esters, and combinations thereof, wherein $G_3$ is selected from a group comprising a covalent bond; a $CH_2$ group; a $C(CH_3)_2$ group; a $C(CF_3)_2$ group; a $C(CX_3)_2$ group, wherein X is a halogen; a CO group; an O atom; a S atom; a $SO_2$ group; a $Si(CH_3)_2$ group; 9, 9-fluorene group; substituted 9, 9-fluorene; and an OZO group, wherein Z is a aryl group or substituted aryl group, such as phenyl group, biphenyl group, perfluorobiphenyl group, 9, 9-bisphenylfluorene group, and substituted 9, 9-bisphenylfluorene.

2. The transparent film of claim 1, wherein the film thickness is greater than approximately 10 μm.

3. The transparent film of claim 2, wherein the film thickness is between approximately 10 μm and approximately 100 μm.

4. The transparent film of claim 1, wherein the film is adhered to a substrate and wherein the film thickness is greater than approximately 5 μm.

5. The transparent film of claim 4, wherein the substrate is a glass film with a thickness greater than approximately 50 μm.

6. The transparent film of claim 1, wherein the film is cured between approximately 90% and approximately 110% of the glass transition temperature of the film.

7. The transparent film of claim 1, wherein the optical transmittance is greater than approximately 80% between 400 nm and 750 nm.

8. The transparent film of claim 1, wherein the coefficient of thermal expansion is less than approximately 10 ppm/° C.

* * * * *